Figure 1:
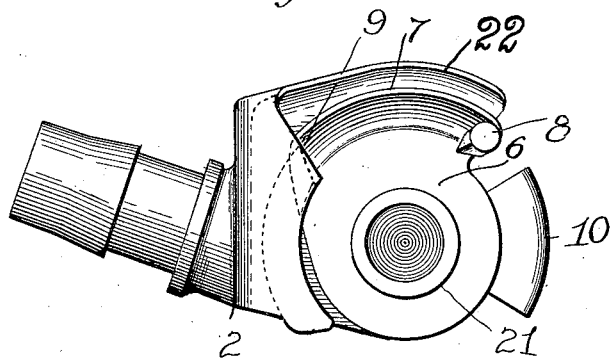
Figure 2:
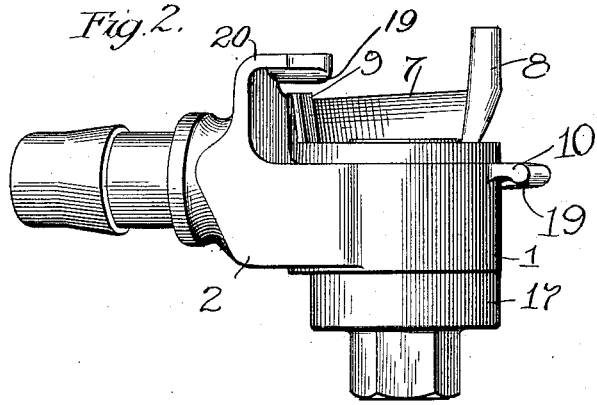
Figure 3:
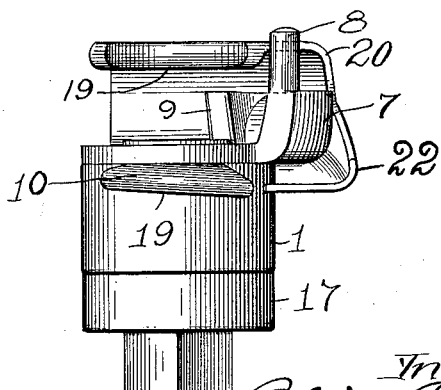

O. P. WILHELM.
AIR BRAKE HOSE COUPLING.
APPLICATION FILED SEPT. 7, 1909.

1,022,453.

Patented Apr. 9, 1912.

2 SHEETS—SHEET 1.

Witnesses
H. R. L. White.
R. A. White.

Inventor
Oliver P. Wilhelm
By Rudolph Wm. Lotz Atty.

COLUMBIA PLANOGRAPH CO., WASHINGTON, D. C.

O. P. WILHELM.
AIR BRAKE HOSE COUPLING.
APPLICATION FILED SEPT. 7, 1909.
1,022,453.
Patented Apr. 9, 1912.
2 SHEETS—SHEET 2.
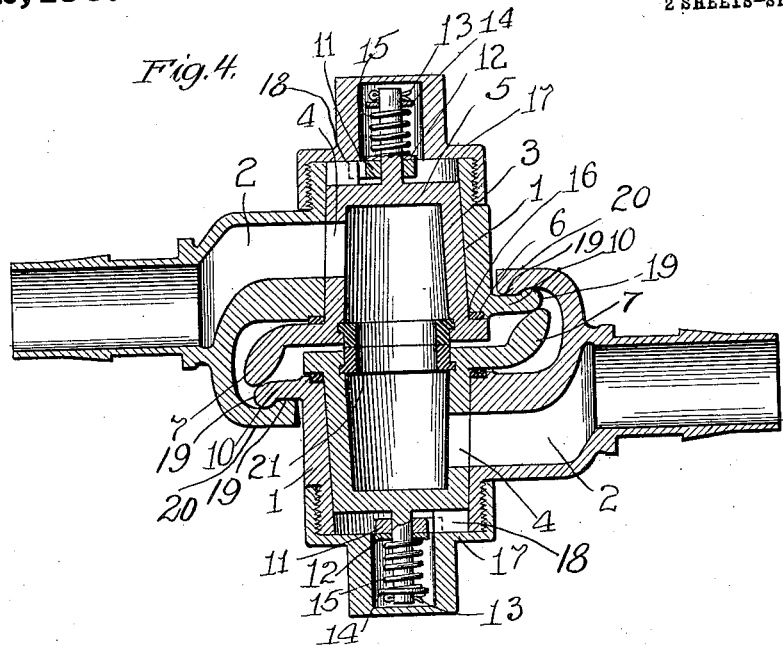
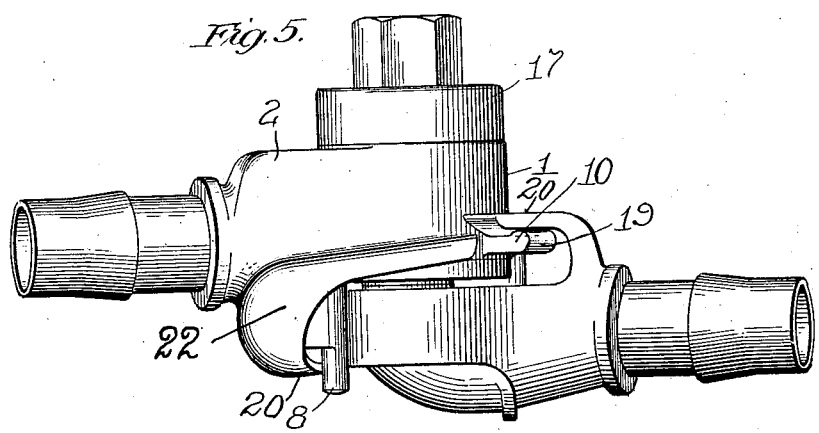
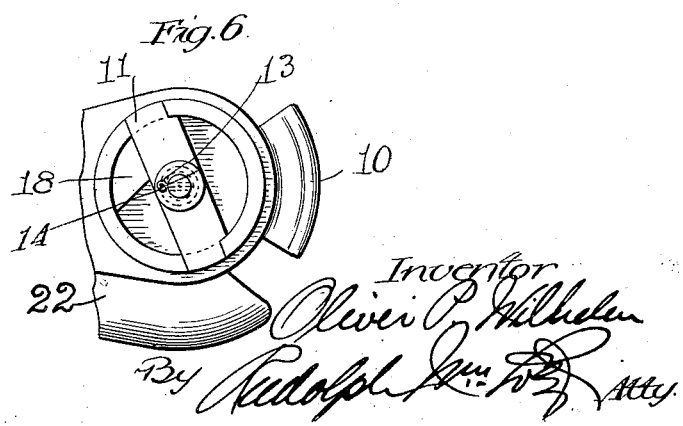
Witnesses
H. R. L. White
R. A. White
Inventor
Oliver P. Wilhelm
By Rudolph ___ Atty.

UNITED STATES PATENT OFFICE.

OLIVER P. WILHELM, OF MICHIGAN CITY, INDIANA.

AIR-BRAKE-HOSE COUPLING.

1,022,453.

Specification of Letters Patent. Patented Apr. 9, 1912.

Application filed September 7, 1909. Serial No. 516,489.

*To all whom it may concern:*

Be it known that I, OLIVER P. WILHELM, citizen of the United States, residing at Michigan City, in the county of La Porte and State of Indiana, have invented certain new and useful Improvements in Air-Brake-Hose Coupling; and I do hereby declare the following to be a full, clear, and exact description of the invention, such as will enable others skilled in the art to which it appertains to make and use the same.

This invention relates to a novel construction in a coupling for air brake hose on cars, the object being to provide a coupling containing valves controlling the passage of air and which are operated automatically in the act of coupling and uncoupling hose of adjacent cars to insure open communication between adjacent cars when coupled and insure shutting off the air when the cars are uncoupled by hand, and consists in the features of construction and combinations of parts hereinafter fully described and claimed.

In the accompanying drawings illustrating this invention: Figure —1— is a top plan view of an air brake coupling member constructed in accordance with my invention. Fig. —2— is a side elevation of the same. Fig. —3— is an end elevation of the same. Fig. —4— is a central vertical sectional view through two coupling members in their coupled positions. Fig. —5— is a side elevation showing a coupling member constructed in accordance with my invention coupled to the ordinary coupling head now in use on practically all railroads in the United States. Fig. —6— is a fragmentary detail top plan view of a coupling member constructed in accordance with my invention showing a cross bar and stop employed, same being visible when the cap is removed.

My invention has for its main object to provide a hose coupling which is equipped with a valve controlling the passage of air therethrough and which said valve is so arranged that in uncoupling the air brake hose of adjacent cars the valve is automatically closed so as to prevent setting the brakes or permitting escape of air to effect this result.

A further object of the invention is to provide an air brake coupling each member of which will coact with the ordinary coupling head with which all cars are at present equipped to properly couple the air brake mechanism of adjacent cars.

A further object of the invention is to provide an air brake coupling equipped with a valve which will remain open in the event of the coupling members becoming separated by the parting of a train so that the air brakes on both sections of the train would immediately become set.

A further object of the invention is to provide valve operating mechanism for the coupling members which is so shielded and protected as to minimize the danger of the valves being accidentally operated by striking obstructions when the coupling member depends freely at the end of the air brake hose.

Other objects of the invention will appear in the following specification.

Both the members of my air brake coupling are identical with each other in construction so that description of one thereof will be equally descriptive of the other.

The shape in plan of the opposing faces of my said coupling members is identical with that of the ordinary or standard coupling member now generally used, this design being followed for the purpose of enabling my said coupling member to coact or be coupled with the ordinary coupling member, this being essential and constituting a very important feature of my invention for the reason that if substitution were to be effected it would be impossible to take all cars simultaneously out of service but the change would have to be gradually made and when made it would be essential that no interference with the coupling of cars equipped with the old and new members should be met with.

The coupling head is provided with a central tapered recess 1 communicating at one side with a port 2 through which air is received or discharged according to the position of the car in the train. In said recess the tapered valve 3 is received, the latter being provided with a port 4 adapted to register with the port 2 and being closed at one end, as at 5, the other end thereof being open and equipped with an annular flange 6 provided at one side with a segmental extension 7 terminating at its ends in a stem 8 and a stop 9, respectively, between which the segmental lip 10 on the valve casing of the adjacent coupler is received when two members are coupled. The said valve 3 is of less length than the opening 1 in which it is received and spanning said opening in the outer end of the coupling is a removable bar 11 provided with a central opening through which the shank 12 of the valve 3 passes. At its free end said shank is provided with a cross head, such as a cotter pin 13, against which a washer 14 bears. A spring 15 is interposed between said cross bar 11 and said washer 14 and serves to hold the valve 3 snugly in contact with the wall of the opening so as to insure a fluid tight joint and take up wear in a well-known manner. Between the annular flange 6 of said valve 3 and the end of the coupling casing is interposed a small brass washer 16 preferably ground in place and which serves further to insure a fluid tight joint between the valve and the casing. The said stop 9 is extended so that when the valve is fully closed said stop projects underneath the wing 20 and consequently into the path of the lip 10 of the other coupling member so as to prevent insertion of the latter underneath said wing and thus effect coupling without actuating said valve. Thus the brakeman will be compelled to insert the wing between said stem 8 and said stop 9 and operate the valve in order to effect coupling. A cap 17 is mounted on the outer end of the casing and receives the said shank 12 of the valve and also protects the end wall 5 thereof in a well-known manner. The said valve 3 is adapted to turn through an arc of somewhat less than 90 degrees although this arc may be increased or diminished without departing from the spirit of the invention. A stop 18 integral with the end wall 5 of the valve engages the cross bar 11 and limits the movement of said valve in both directions.

The coupler casing is provided, as usual, with the segmental lip 10 disposed at an incline and providing a cam surface which coacts with and is engaged by a similar overhanging wing 20 at a substantially diametrically opposite point on the said coupler in the ordinary manner, that is to say, the said segmental lip 10 of one coupling member is engaged by the said overhanging wing 20 of a companion coupling member so that when said members are turned in one direction in the act of coupling, the two members are drawn toward each other thereby compressing the rubber washers 21 disposed in the open end of the valves 3 in the usual and well-known manner to insure a fluid tight joint between the coupled members. The said lips 10 and wings 20 are enlarged as at 19 on their free edges, said ribs 19 coacting to maintain the members relatively concentric and resisting accidental parting thereof.

In coupling two members it is essential that they be primarily disposed in a given position with relation to each other and then turned through an arc substantially equal to the length of the lip 10 thereby throwing the latter into engagement with the wing 20 of the adjacent coupling.

In order to properly primarily position two coupling members constructed in accordance with my invention or one of same and one of the ordinary type it is necessary that the valve 3 be first turned to the position in which the port 2 is completely closed. Unless this is effected the stop 9, previously referred to, will lie in the path of the segmental lip 10 of the adjacent member and interfere with and prevent proper primary positioning of the two coupling members.
It is essential that in the event of the accidental breaking of the train the air brake hose coupling should be capable of pulling apart and that when so parted the valves 3 in both coupling members should be wide open so as to permit the freest possible escape of air whereby the brakes become quickly set on both sections. It is necessary therefore, especially where air compressors of large capacity are provided on the locomotive, that ports be provided sufficiently large to prevent maintenance of sufficient air pressure in the air brake system to prevent setting of the brakes. In my device this is rendered possible by lengthening the ports 2 and 4 or providing a plurality of said ports and a valve of the type known as a grid iron valve. This modification is believed to be so easily understood as to render special illustration thereof unnecessary. The arc through which the valve 3 is turned to fully open or fully close the port 2 is, however, limited substantially to about 90 degrees, a change in this particular being inadvisable owing to the fact that train crews are accustomed to making this short turn in the act of coupling and deviation from the customary arc might cause an omission to be made which would prove disastrous, and which, in any case, might cause leakage.
In accidental parting of the train both pieces of the air brake hose on adjacent ends of the cars becoming uncoupled will swing freely and the force of the escaping air will naturally serve to throw said ends so that it is possible that they will strike a part of the car or might possibly strike an obstruction in the track and such obstruction might in turn possibly hit the valve stem 8 and close the valve. The position of said valve stem 8 when the valve is closed is, as indicated in dotted lines in Fig. —1—, adjacent one end of the overhanging segmental wing 20 which acts to protect said stem 8 from contact with any obstructions. The said stem 8 is made as short as possible consistent with convenience in operating the valve and to further protect the same against striking any obstructions I provide a shield flange 22 on the side of the coupling member on which said stem 8 moves and which extends through an arc substantially equal to the arc of movement of said stem 8 and parallels the same. This flange is concavo-convex and would serve, in striking any obstruction, to throw the body of the member away from such obstructions and would effectually prevent the same from contacting with said stem 8 and thus possibly closing the valve. The particular purpose of providing the said valves 3 in the hose coupling members is to avoid the necessity of employing angle cocks which will shut off the air throughout that part of a train back of one of said angle cocks when closed, that is to say, in the event of breaking a train for the purpose, for example, of side tracking a car from the middle of the same it is necessary for the brakeman before uncoupling the train to close the angle cock on the front portion of it. If he should forget to do this the brakes would become set on said forward end portion of the train and he is then obliged to return and close said cock before the said front section can proceed. Having closed the angle cock it would become necessary for him to re-couple the rear portion of the train after shutting out the one car, and if in so doing he should omit to open the said angle cock the now rear portion of the train would be absolutely without air and consequently the braking power of the train would be limited to the forward end portion of the same which is directly connected with the locomotive. The omission to open an angle cock in a train may cause a very serious wreck by reason of the diminished braking power and the consequent impossibility of bringing the train to a standstill with the usual rapidity. By means of my coupling an omission of this nature is absolutely prevented for the reason that it is impossible to uncouple the air brake hose by hand without simultaneously closing both valves 3 and thus preventing unnecessary loss of air and causing an unnecessary setting of the brakes, and in re-coupling it is equally impossible that any of the valves 3 shall remain closed so that any train equipped with air brake couplings constructed in accordance with my invention will be absolutely certain of through communication of air from the locomotive to the last car. This is, of course, very desirable and essential for very well-known reasons. The taper of the valve and the pressure of the spring 15 makes said valve fit so snugly as to cause it to turn only upon the application of considerable force so that looseness and consequent possibility of accidental turning are necessarily avoided.

My said device is simple and efficient and occupies relatively small space considering the additional mechanism contained therein.

I claim as my invention:

1. A hose coupling, comprising two opposed members each equipped with a segmental lip on the body thereof and a segmental wing overhanging said body at a diametrically opposite point from said lip, said lips and wings of opposed members being adapted to engage each other to maintain said members coupled, there being a tapered recess in at least one of said members of greater diameter at its mouth and communicating between its ends with the hollow stem of said member for establishing communication between the same and said other member, a tapered valve in the said recessed member adapted to control the passage of fluid therethrough and projecting at one end from the face thereof opposing the other member, a segmental flange on the projecting end of said valve disposed to pass underneath the wing of its containing member, and projections at the ends of said flange adapted to receive the lip of the other member therebetween, whereby relative rotary movement of said coupling members is transmitted to said valve to open and close the same.

2. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, at least one of said members being provided in the face thereof opposing the other member with a tapered recess communicating between its ends with the hollow stem of said member, a cup valve fitting said recess and projecting from the mouth thereof, said valve having an opening between its ends adapted to establish communication with said hollow stem, a segmental flange on the projecting end portion of said valve, shoulders at the ends of said flange, said flange being adapted to pass underneath the wing of said member when turned to open position, the lip of the other member being adapted to be received between said shoulders whereby relative rotary movement of said members is transmitted to said valve to open and close the same.

3. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, at least one of said members being provided in the face thereof opposing the other with a tapered recess communicating between its ends with the hollow stem of said member, a cross bar spanning the bottom of said recess, a cup valve fitting said recess and projecting therefrom at one end, said projecting end thereof being open and the other end thereof closed, a valve stem on the closed end of said valve adapted to pass through an opening in said cross bar, a spring engaging said valve stem to normally draw said valve into said recess, a segmental flange on the projecting end of said valve, and projections at the ends of said flange between which the lip of the other member is adapted to be received, whereby relative rotary movement of said members is transmitted to said valve to open and close the same.

4. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, at least one of said members being provided in the face thereof opposing the other with a tapered recess communicating between its ends with the hollow stem of said member, a cross bar spanning the bottom of said recess, a cup valve fitting said recess and projecting therefrom at one end, said projecting end thereof being open and the other end thereof closed, a valve stem on the closed end of said valve adapted to pass through an opening in said cross bar, a spring engaging said valve stem to normally draw said valve into said recess, a segmental flange on the projecting end of said valve, and projections at the ends of said flange between which the lip of the other member is adapted to be received, whereby relative rotary movement of said members is transmitted to said valve to open and close the same, said projections so disposed relatively to the interfitting lip and wing of opposed members as to prevent the same from being moved into relative coupling positions unless said valve is closed.

5. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, there being openings in the opposed faces of said members for establishing communication between the same, a hollow cup-shaped valve seated in same, a hollow cup-shaped valve seated in and projecting from one of said members, said valve open at its projecting end and provided with a lateral opening communicating with the stem of said member, a segmental flange on the projecting end of said valve adapted when the latter is turned to open position to pass underneath the wing of its carrying member, projections at the ends of said flange, said lip of said other member being adapted to be received and fit snugly between said projections and engage the same, whereby relative rotary movement of the said members is transmitted without loss to said valve to open and close the same.

6. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, there being openings in the opposed faces of said members for establishing communication between the same, a valve in at least one of said members adapted to control the passage of fluid therethrough, said valve being hollow and open at its exposed end, a segmental flange on said exposed end portion of said valve adapted when said valve is turned to open the same to pass underneath the wing of the member carrying the same, projections at the ends of said flange between which the lip of the other member is adapted to be received and engaged, whereby relative rotary movement of said members is transmitted to said valve to move the same to respectively opposite limits of its movement to open and close the same in accordance with relative rotary coupling and uncoupling movement of said members, the movement of said segmental flange relatively to said wing being such that until the valve is fully closed the respective wings and lips of said members will remain in engagement with each other.

7. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, there being openings in the opposed faces of said members for establishing communication between the same, a valve in at least one of the members adapted to control the passage of fluid therethrough, a segmental flange on said valve and disposed to pass underneath the wing thereof, when the valve is opened, projections at the respective ends of said flange one of which is of greater height than the wing of the member and serves as a means for manually operating said valve, said lip of said other member being adapted to be received and fit snugly between said projections and engage the same, whereby relative rotary movement of the said members is transmitted without loss to said valve to open and close the same, and a segmental guard flange on the body of valve containing member disposed adjacent said wing and adapted to protect said projections.

8. A hose coupling comprising two opposed members each equipped with a segmental lip on the body thereof and a segmental wing overhanging said body at a diametrically opposite point from said lip, said lips and wings of opposed members being adapted to engage each other to maintain said members coupled, there being openings in the opposed faces of said members for establishing communication between the same, a valve in at least one of the members adapted to control the passage of fluid therethrough, and a segmental flange on said valve disposed to pass underneath the wing thereof, when the valve is opened, projections at the respective ends of said segmental flange, one of said projections being of greater height than the wing and serving as a means for manually operating said valve, said lip of said other member being adapted to be received and fit snugly between said projections and engage the same, whereby relative rotary movement of the said members is transmitted without loss to said valve to open and close the same, and a segmental guard flange on the body of valve containing member disposed adjacent said wing and adapted to protect said projections, one of said projections of said valve extending underneath the wing when the valve is fully closed and serving to prevent insertion of the lip of the other coupling member underneath said wing to couple the same.

In testimony whereof I have signed my name in presence of two subscribing witnesses.

OLIVER P. WILHELM.

Witnesses:
SANDFORD WILHELM,
RUDOLPH WM. LOTZ.

Copies of this patent may be obtained for five cents each, by addressing the "Commissioner of Patents, Washington, D. C."